(12) United States Patent
Park et al.

(10) Patent No.: US 11,462,832 B2
(45) Date of Patent: Oct. 4, 2022

(54) ANTENNA DEVICE

(71) Applicant: Samsung Electro-Mechanics Co., Ltd., Suwon-si (KR)

(72) Inventors: Juhyoung Park, Suwon-si (KR); Daeki Lim, Suwon-si (KR); Youngsik Hur, Suwon-si (KR); Sungyong An, Suwon-si (KR); Jae Yeong Kim, Suwon-si (KR); Chin Mo Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 106 days.

(21) Appl. No.: 17/149,968

(22) Filed: Jan. 15, 2021

(65) Prior Publication Data

US 2022/0085510 A1    Mar. 17, 2022

(30) Foreign Application Priority Data

Sep. 16, 2020   (KR) .......................... 10-2020-0119013

(51) Int. Cl.
| | |
|---|---|
| *H01Q 9/04* | (2006.01) |
| *H04B 3/52* | (2006.01) |
| *H01Q 1/24* | (2006.01) |
| *H01P 3/16* | (2006.01) |
| *H01Q 13/28* | (2006.01) |

(52) U.S. Cl.
CPC ............ *H01Q 9/0421* (2013.01); *H01P 3/16* (2013.01); *H01Q 1/243* (2013.01); *H01Q 9/0435* (2013.01); *H01Q 13/28* (2013.01); *H04B 3/52* (2013.01)

(58) Field of Classification Search
CPC . H01Q 9/04; H01Q 1/24; H01Q 13/28; H01P 3/16; H04B 3/52
See application file for complete search history.

(56) References Cited

U.S. PATENT DOCUMENTS

| | | | | |
|---|---|---|---|---|
| 2011/0057859 | A1* | 3/2011 | Rho | ..................... H01Q 9/0421 343/893 |
| 2015/0263431 | A1* | 9/2015 | Moon | ..................... H01Q 21/26 343/730 |

FOREIGN PATENT DOCUMENTS

| | | |
|---|---|---|
| KR | 10-2011-0025547 A | 3/2011 |
| KR | 10-2014-0069968 A | 6/2014 |
| KR | 10-2015-0135557 A | 12/2015 |

* cited by examiner

*Primary Examiner* — Andrea Lindgren Baltzell
(74) *Attorney, Agent, or Firm* — NSIP Law

(57) ABSTRACT

An antenna device includes first and second dielectric layers. The first dielectric layer includes first and second sides facing each other in a third direction. The second dielectric layer includes third and fourth sides facing each other in the third direction. A first antenna patch is disposed on the first side of the first dielectric layer. A second antenna patch is disposed on the third side of the second dielectric layer. Signals with a first frequency bandwidth are transmitted or received electrical signals applied to the first antenna patch. Signals with a different second frequency bandwidth are transmitted or received by an electrical signal applied to the second antenna patch. A height of the second dielectric layer measured to the third side from the fourth side in a direction parallel to a third direction is greater than a height of the first dielectric layer measured to the first side from the second side.

20 Claims, 10 Drawing Sheets

ANTENNA DEVICE

CROSS-REFERENCE TO RELATED APPLICATION(S)

This application claims the benefit under 35 USC § 119(a) of Korean Patent Application No. 10-2020-0119013 filed on Sep. 16, 2020 in the Korean Intellectual Property Office, the entire disclosure of which is incorporated herein by reference for all purposes.

BACKGROUND

1. Field

The following description relates to an antenna device.

2. Description of Related Art

Recently, millimeter wave (mmWave) communication including 5th generation (5G) communication has been actively implemented. With regard to 5th generation (5G) communication, there is an increased desire for a multi-bandwidth antenna that transmits and receives radio frequency (RF) signals with various bandwidths with one antenna.

Additionally, as portable electronic devices are developed, the size of the screen in a display area of the electronic device increases, the size of a bezel that is a non-display area in which an antenna is disposed decreases, and the area of the region in which the antenna may be installed is also reduced.

The above information disclosed in this Background section is only for enhancement of understanding of the background of the described technology, and therefore it may contain information that does not form the prior art that is already known in this country to a person of ordinary skill in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an antenna device includes a first dielectric layer and a second dielectric layer separated from each other in a first direction, the first dielectric layer comprising a first side and a second side facing each other in a third direction, and the second dielectric layer including a third side and a fourth side facing each other in the third direction; a first antenna patch, disposed on the first side of the first dielectric layer; and a second antenna patch, disposed on the third side of the second dielectric layer, wherein a signal comprising a first frequency bandwidth is transmitted and received based on an electrical signal applied to the first antenna patch, wherein a signal with a second frequency bandwidth that is different from the first frequency bandwidth is transmitted and received based on an electrical signal applied to the second antenna patch, and wherein, in a direction parallel to the third direction, a height of the second dielectric layer measured from the fourth side of the second dielectric layer to the third side of the second dielectric layer is greater than a height of the first dielectric layer measured from the second side of the first dielectric layer to the first side of the first dielectric layer.

A center frequency of the first frequency bandwidth may be lower than a center frequency of the second frequency bandwidth.

A first surface of the first antenna patch may be larger than a first surface of the second antenna patch.

A ground plane may be disposed below the second side of the first dielectric layer and may be disposed below the fourth side of the second dielectric layer.

The first dielectric layer may include a first layer of a first dielectric constant, and a second layer of a second dielectric constant that is different from the first dielectric constant, and the second layer may include a small dielectric constant, and may include an air cavity.

The third direction may be perpendicular to the first direction.

The first dielectric layer may include a first layer of a first dielectric constant, and a second layer of a second dielectric constant that is different from the first dielectric constant, and the second layer may include a small dielectric constant, and may include an air cavity.

In a general aspect, an antenna device includes a first dielectric layer and a second dielectric layer separated from each other in a first direction; a first antenna patch disposed on the first dielectric layer; and a second antenna patch disposed on the second dielectric layer, wherein the first dielectric layer has a first width in parallel with the first direction, and a second width in parallel with a second direction, and the second dielectric layer has a third width in parallel with the first direction, and a fourth width in parallel with the second direction, the first width is greater than the third width, and the second width is less than the fourth width.

A signal with a first frequency bandwidth may be transmitted and received based on an electrical signal applied to the first antenna patch, a signal with a second frequency bandwidth may be transmitted and received based on an electrical signal applied to the second antenna patch, and a center frequency of the first frequency bandwidth may be lower than a center frequency of the second frequency bandwidth.

A first surface of the first antenna patch may be larger than a first surface of the second antenna patch.

A ground plane may be disposed below a second side of the first dielectric layer and may be disposed below a fourth side of the second dielectric layer.

A height of the second dielectric layer may be greater than a height of the first dielectric layer with respect to the ground plane.

The second direction may be perpendicular to the first direction.

A ground plane may be disposed below a second side of the first dielectric layer, and may be disposed below a fourth side of the second dielectric layer, wherein a height of the second dielectric layer may be greater than a height of the first dielectric layer with respect to the ground plane.

A first surface of the first antenna patch may be larger than a first surface of the second antenna patch.

In a general aspect, an antenna device includes a plurality of first dielectric layers and a plurality of second dielectric layers separated from each other and alternately disposed in a first direction; a plurality of first antenna patches disposed on the first dielectric layers; and a plurality of second antenna patches disposed on the second dielectric layers, wherein the respective first dielectric layers have a first width in parallel with the first direction, and a second width in parallel with the second direction, the respective second dielectric layers have a third width in parallel with the first direction and a fourth width in parallel with the second direction, the first width is greater than the third width, and the second width is less than the fourth width.

A signal with a first frequency bandwidth may be transmitted and received based on an electrical signal applied to the first antenna patches, a signal with a second frequency bandwidth is transmitted and received based on an electrical signal applied to the second antenna patches, and a center frequency of the first frequency bandwidth is lower than a center frequency of the second frequency bandwidth.

A ground plane may be disposed below the first dielectric layers and the second dielectric layers, wherein a height of the second dielectric layers may be greater than a height of the first dielectric layers with respect to the ground plane.

A first surface of the first antenna patches may be larger than a first surface of the second antenna patches.

A ground plane may be disposed below the first dielectric layers and the second dielectric layers, wherein a height of the second dielectric layers may be greater than a height of the first dielectric layers with respect to the ground plane.

Other features and aspects will be apparent from the following detailed description, the drawings, and the claims.

Figure 1:
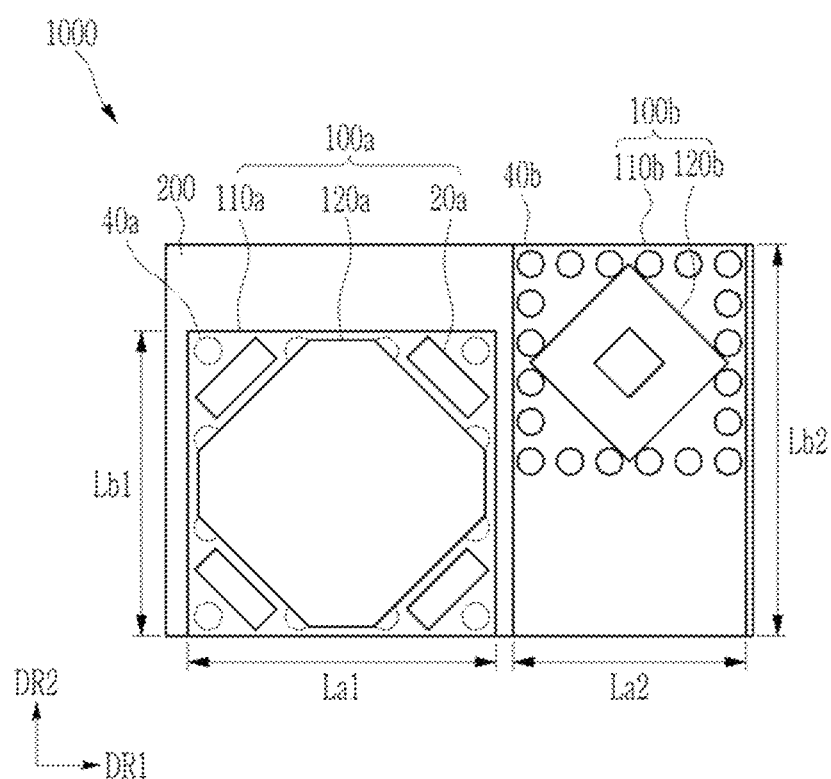
FIG. 1 illustrates a top plan view of an example antenna device, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

The size and thickness of each configuration shown in the drawings are arbitrarily shown for better understanding and ease of description, but the examples are not limited thereto. In the drawings, the thickness of layers, films, panels, regions, etc., are exaggerated for clarity. The thicknesses of some layers and areas are exaggerated for convenience of explanation.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means disposed on or below the object portion, and does not necessarily mean disposed on the upper side of the object portion based on a gravitational direction.

The phrase "in a plan view" means viewing an object portion from the top, and the phrase "in a cross-sectional view" means viewing a cross-section of which the object portion is vertically cut from the side.

Throughout the specification, when it is described that a part is "coupled" to another part, the part may be "directly or physically connected" to the other part or "indirectly or non-contact coupled" to the other part with a third part therebetween.

Throughout the specification, when it is described that a part is "connected" to another part, the part may be "directly connected" to the other element, may be "connected" to the other part through a third part, or may be connected to the other part physically or electrically, and they may be referred to by different titles depending on positions or functions, but respective portions that are substantially integrated into one body may be connected to each other.

An antenna device 1000, in accordance with one or more embodiments, will now be described with reference to FIG. 1. FIG. 1 illustrates a top plan view of an example antenna device.

Referring to FIG. 1, the antenna device 1000 includes a first antenna 100a and a second antenna 100b disposed to be adjacent in a first direction DR1.

The first antenna 100a includes a first dielectric layer 110a and a first antenna patch 120a disposed on the first dielectric layer 110a.

The first antenna patch 120a of the first antenna 100a may have a polygonal shape in a plan view, and the first antenna 100a may further include auxiliary antenna patches 20a disposed around the first antenna patch 120a. The auxiliary antenna patches 20a may induce additional coupling with the first antenna patch 120a to widen the bandwidth of the first antenna 100a.

The first antenna 100a may include a plurality of first adhesive pads 40a disposed below the first dielectric layer 110a and overlapping the first dielectric layer 110a. The first antenna 100a may be mounted on the connection substrate 200 through the first adhesive pads 40a.

The first dielectric layer 110a of the first antenna 100a may have a first width La1 in parallel with a first direction DR1, and may have a second width Lb1 in parallel with a second direction DR2 substantially perpendicular to the first direction DR1.

The second antenna 100b may include a second dielectric layer 110b and a second antenna patch 120b disposed on the second dielectric layer 110b.

The second antenna patch 120b of the second antenna 100b has a polygonal shape in a plan view.

The second antenna 100b includes a plurality of second adhesive pads 40b disposed below the second dielectric layer 110b and overlapping the second dielectric layer 110b. The second antenna 100b may be attached to the connection substrate 200 through the second adhesive pads 40b.

A surface of the first antenna patch 120a of the first antenna 100a may be wider than a surface of the second antenna patch 120b of the second antenna 100b.

An area of the antenna patch of the antenna may influence a resonance frequency of the antenna, and the resonance frequency of the antenna including the antenna patch with a relatively narrow surface may be high. In an example, the surface of the first antenna patch 120a of the first antenna 100a may be wider than the surface of the second antenna patch 120b of the second antenna 100b, and the resonance frequency of the second antenna 100b may be higher than the resonance frequency of the first antenna 100a.

The second dielectric layer 110b of the second antenna 100b may have a third width La2 in parallel with the first direction DR1, and may have a fourth width Lb2 in parallel with the second direction DR2 substantially perpendicular to the first direction DR1.

The first width La1 of the first dielectric layer 110a of the first antenna 100a may be greater than the third width La2 of the second dielectric layer 110b of the second antenna 100b, and the second width Lb1 of the first dielectric layer 110a of the first antenna 100a may be narrower than the fourth width Lb2 of the second dielectric layer 110b of the second antenna 100b.

The first antenna 100a may transmit or receive RF signals with a first bandwidth, and the second antenna 100b may transmit or receive RF signals with a second bandwidth that is different from the first bandwidth. A center frequency of the first bandwidth may be lower than a center frequency of the second bandwidth. For example, the center frequency of the first bandwidth of the first antenna 100a may be about 24 GHz or about 28 GHz, and the center frequency of the second bandwidth of the second antenna 100b may be about 39 GHz.

The antenna device 1000 may include a first antenna 100a to transmit and receive the RF signals of the first bandwidth with a relatively low center frequency, and a second antenna 100b to transmit and receive the RF signals of the second bandwidth with a relatively high center frequency disposed to be adjacent in the first direction DR1. Further, the first width La1 of the first dielectric layer 110a of the first antenna 100a may be greater than the third width La2 of the second dielectric layer 110b of the second antenna 100b with respect to the first direction DR1, and the second width Lb1 of the first dielectric layer 110a of the first antenna 100a is less than the fourth width Lb2 of the second dielectric layer 110b of the second antenna 100b with respect to the second direction DR2 that is perpendicular to the first direction DR1.

As described, the second antenna 100b may be narrower than the first antenna 100a with respect to the first direction DR1, and the second antenna 100b may be wider than the first antenna 100a with respect to the second direction DR2. Therefore, the transmitting and receiving intensity of the RF signals of the second antenna 100b may be increased, compared to the example in which the width of the first antenna 100a is greater than the width of the second antenna 100b, with respect to the first direction DR1 and the second direction DR2.

According to the antenna device 1000 according to an example, with respect to the second direction DR2, the second antenna 100b may be wider than the first antenna 100a, so the gain of the second antenna 100b including a relatively narrow antenna patch for transmitting or receiving RF signals with a relatively high frequency bandwidth may be increased.

Figure 2:
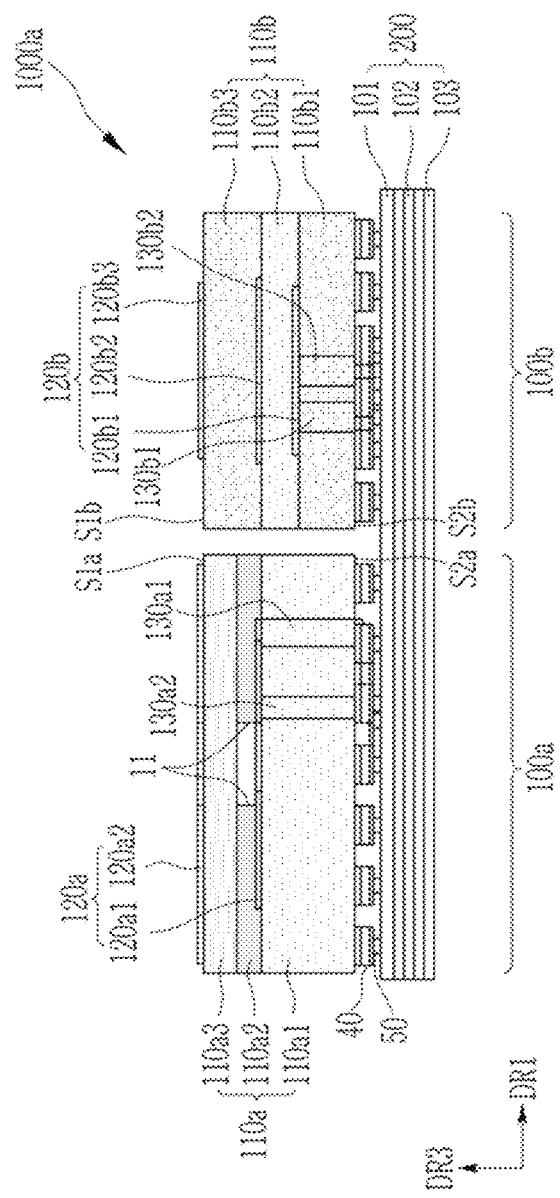
FIG. 2 illustrates a cross-sectional view of an example antenna device, in accordance with one or more embodiments.

A configuration of an antenna device 1000a according to an example will now be described with reference to FIG. 1 and FIG. 2. FIG. 2 illustrates a cross-sectional view of an example antenna device, in accordance with one or more embodiments.

Referring to FIG. 1 and FIG. 2, the antenna device 1000a according to the present embodiment may include a first antenna 100a and a second antenna 100b adjacently disposed in the first direction DR1.

The first antenna 100a includes a first dielectric layer 110a and a first antenna patch 120a.

The first dielectric layer 110a may include a first layer 110a1, a second layer 110a2, and a third layer 110a3 that are sequentially disposed in the third direction DR3.

Dielectric constants of the first layer 110a1 to the third layer 110a3 may be different. In an example, the dielectric constants of the first layer 110a1 and the third layer 110a3 may be greater than the dielectric constant of the second layer 110a2. In an example, the first layer 110a1 and the third layer 110a3 may include a material with a relatively high dielectric constant in a like manner of a ceramic-based material such as a low temperature co-fired ceramic (LTCC) or a glass-based material, and may further contain at least one of magnesium (Mg), silicon (Si), aluminum (Al), calcium (Ca), and titanium (Ti). In an example, the second layer 110a2 may include a polymer, it may include a material with high flexibility such as a liquid crystal polymer (LCP) or a polyimide, it may include an epoxy resin with high strength or adhesiveness, or it may include Teflon and a prepreg.

The first layer 110a1 to the third layer 110a3 may have different thicknesses. For example, the first layer 110a1 may be the thickest, and the second layer 110a2 may be thinner than the first layer 110a1 and the third layer 110a3.

The second layer 110a2 may have adherence, and may have an air cavity 11 formed in a center. The air cavity 11 may be filled with air, by which the dielectric constant of the second layer 110a2 may become less than the dielectric constants of the first layer 110a1 and the third layer 110a3. A length of a boundary portion between the first layer 110a1 and the second layer 110a2 with different dielectric constants may increase by the air cavity 11. As described, as the first dielectric layer 110a includes a plurality of layers with different dielectric constants, and the second layer 110a2 with a relatively small dielectric constant includes the air cavity 11, a dielectric constant boundary between layers with different dielectric constants is generated, and a radiation pattern of the first antenna 100a may be changed by the dielectric constant boundary side. As described, the gain of the first antenna 100a may be increased by changing the radiation pattern of the first antenna 100a by adjusting the dielectric constant boundary in the dielectric layer 110a.

The first antenna patch 120a of the first antenna 100a may include a first sub-antenna patch 120a1 disposed on the first layer 110a1 of the first dielectric layer 110a and a second sub-antenna patch 120a2 disposed on the third layer 110a3 of the first dielectric layer 110a.

The first dielectric layer 110a of the first antenna 100a may include a first side S1a and a second side S2a facing each other in the third direction DR3, and the second sub-antenna patch 120a2 of the first antenna patch 120a may be disposed on the first side S1a of the first dielectric layer 110a of the first antenna 100a. Further, a plurality of pad portions 40 and a plurality of connectors 50 may be disposed below the second side S2a of the first dielectric layer 110a of the first antenna 100a. The connectors 50 may be a solder ball, a pin, a land, or a pad.

The first antenna 100a includes a first feed via 130a1 and a second feed via 130a2 penetrating through the first layer 110a1 of the first dielectric layer 110a.

The first feed via 130a1 and the second feed via 130a2 may transmit electrical signals to the first sub-antenna patch 120a1 of the first antenna patch 120a of the first antenna 100a. In the illustrated example, the first feed via 130a1 and the second feed via 130a2 are shown to be connected to the first sub-antenna patch 120a1, which is however one example, and according to another example, the first feed via 130a1 and the second feed via 130a2 may be separated from the first sub-antenna patch 120a1 in the third direction DR3 and may transmit electrical signals to the first sub-antenna patch 120a1 by coupling. Additionally, according to another example, the first sub-antenna patch 120a1 may be omitted, the first antenna 100a may include a feeding pattern connected to the first feed via 130a1 and a feeding pattern connected to the second feed via 130a2, and the feeding pattern connected to the first feed via 130a1 and the feeding pattern connected to the second feed via 130a2 may be configured by coupling with the second sub-antenna patch 120a2 to transmit electrical signals.

The first sub-antenna patch 120a1 and the second sub-antenna patch 120a2 of the first antenna patch 120a of the first antenna 100a may overlap each other in the third direction DR3.

The second antenna 100b may include a second dielectric layer 110b and a second antenna patch 120b.

The second dielectric layer 110b may include a fourth layer 110b1, a fifth layer 110b2, and a sixth layer 110b3 sequentially disposed in the third direction DR3.

The dielectric constants of the fourth layer 110b1 to the sixth layer 110b3 may be different. In an example, the dielectric constants of the fourth layer 110b1 and the sixth layer 110b3 may be greater than the dielectric constant of the fifth layer 110b2. As described, as the second dielectric layer 110b includes a plurality of layers with different dielectric constants, the dielectric constant boundary between the layers with different dielectric constants is generated, and the gain of the second antenna 100b may be increased by changing the radiation pattern of the second antenna 100b by the dielectric constant boundary side.

In an example, the fourth layer 110b1 to the sixth layer 110b3 may have different thicknesses. In an example, the fourth layer 110b1 may be the thickest, and the fifth layer 110b2 may be thinner than the fourth layer 110b1 and the sixth layer 110b3. The fifth layer 110b2 may have adherence.

The second antenna patch 120b of the second antenna 100b may include a third sub-antenna patch 120b1 disposed on the fourth layer 110b1 of the second dielectric layer 110b, a fourth sub-antenna patch 120b2 disposed on the fifth layer 110b2, and a fifth sub-antenna patch 120b3 disposed on the sixth layer 110b3.

The second dielectric layer 110b of the second antenna 100b may include a third side S1b and a fourth side S2b facing each other in the third direction DR3, and the fifth sub-antenna patch 120b3 of the second antenna patch 120b may be disposed on the third side S1b of the second dielectric layer 110b of the second antenna 100b. Further, a plurality of pad portions 40 and a plurality of connectors 50 may be disposed below the fourth side S2b of the second dielectric layer 110b of the second antenna 100b.

The second antenna 100b may include a third feed via 130b1 and a fourth feed via 130b2 penetrating through the fourth layer 110b1 of the second dielectric layer 110b.

The third feed via 130b1 and the fourth feed via 130b2 may transmit an electrical signal to the third sub-antenna patch 120b1 of the second antenna patch 120b of the second antenna 100b.

The third sub-antenna patch 120b1, the fourth sub-antenna patch 120b2, and the fifth sub-antenna patch 120b3 of the second antenna patch 120b of the second antenna 100b may overlap each other in the third direction DR3.

The antenna device 1000a may include a connection substrate 200 disposed below the first antenna 100a and the second antenna 100b. The connection substrate 200 may include a ground plane 101 and a plurality of metal layers 102 and 103. Although not shown, the antenna device 1000a may further include an electronic element (not shown) disposed below the connection substrate 200.

The first antenna 100a and the second antenna 100b may be connected to the connection substrate 200 through the pad portions 40 and the connectors 50 disposed below the second side S2a of the first dielectric layer 110a and the fourth side S2b of the second dielectric layer 110b, and the first feed via 130a1, the second feed via 130a2, the third feed via 130b1, and the fourth feed via 130b2 may receive electrical signals from an electronic element disposed below the connection substrate 200.

The first feed via 130a1 and the second feed via 130a2 may transmit electrical signals with different polarization characteristics, and surface currents may flow to the first antenna patch 120a in a perpendicular way with respect to the electrical signals of the first feed via 130a1 and the second feed via 130a2.

When the electrical signals are transmitted to the first feed via 130a1 and the second feed via 130a2, they are transmitted to the first sub-antenna patch 120a1 of the first antenna patch 120a, and the first sub-antenna patch 120a1 and the second sub-antenna patch 120a2 may transmit or receive RF signals. Accordingly, the first antenna 100a may transmit or receive the RF signals with a first bandwidth having different polarization characteristics.

The third feed via 130b1 and the fourth feed via 130b2 may transmit electrical signals having different polarization characteristics, and the surface currents may flow to the second antenna patch 120b in a perpendicular way with respect to the electrical signals of the third feed via 130b1 and the fourth feed via 130b2.

When the electrical signals are transmitted to the third feed via 130b1 and the fourth feed via 130b2, they are transmitted to the third sub-antenna patch 120b1 of the second antenna patch 120b, and the third sub-antenna patch 120b1, the fourth sub-antenna patch 120b2, and the fifth sub-antenna patch 120b3 may transmit or receive RF signals. By this, the second antenna 100b may transmit or receive the RF signal of a second bandwidth with different polarization characteristics.

As described above with reference to FIG. 1, the surface of the first antenna patch 120a of the first antenna 100a may be wider than the surface of the second antenna patch 120b of the second antenna 100b. Further, the second antenna 100b is wider than the first antenna 100a with reference to the second direction DR2, so the gain of the second antenna 100b including a relatively narrow antenna patch for transmitting or receiving RF signals may be increased.

Figure 3:
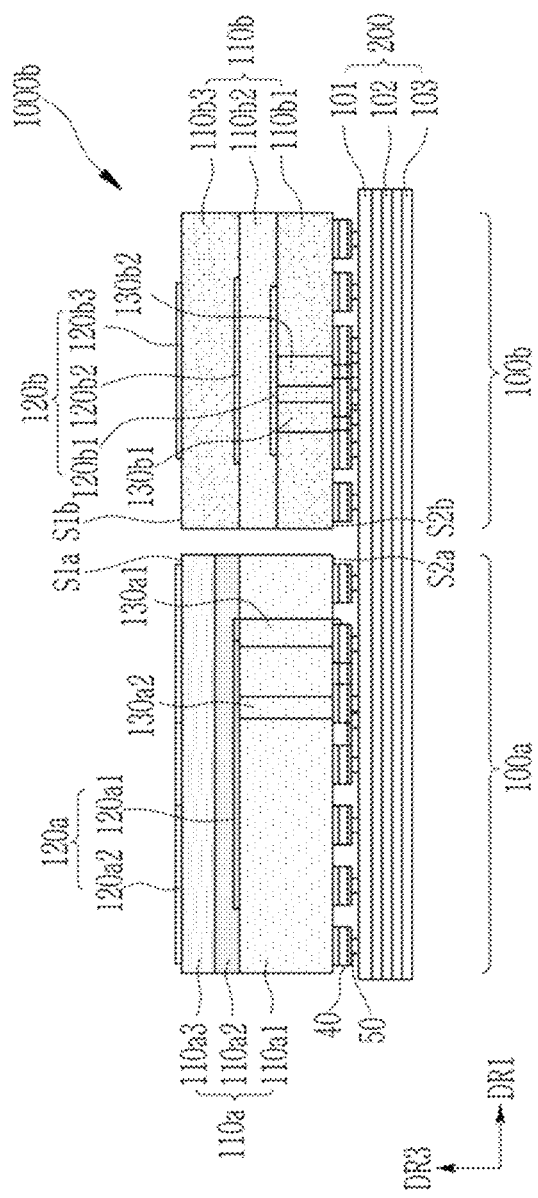
FIG. 3 illustrates a cross-sectional view of an example antenna device, in accordance with one or more embodiments.

An antenna device 1000b according to another example will now be described with reference to FIG. 1 and FIG. 3. FIG. 3 illustrates a cross-sectional view of an antenna device, in accordance with one or more embodiments.

Referring to FIG. 1 and FIG. 3, the antenna device 1000b, according to the example, is similar to the example antenna device 1000a described with reference to FIG. 2.

The antenna device 1000b may include a first antenna 100a and a second antenna 100b adjacently disposed in the first direction DR1.

The first antenna 100a may include a first dielectric layer 110a and a first antenna patch 120a.

The first dielectric layer 110a may include a first layer 110a1, a second layer 110a2, and a third layer 110a3 sequentially disposed in the third direction DR3.

The first layer 110a1 to the third layer 110a3 may have different dielectric constants, and the first layer 110a1 to the third layer 110a3 may have different thicknesses.

The first antenna patch 120a of the first antenna 100a may include a first sub-antenna patch 120a1 disposed on the first layer 110a1 of the first dielectric layer 110a and a second sub-antenna patch 120a2 disposed on the third layer 110a3 of the first dielectric layer 110a.

The first dielectric layer 110a of the first antenna 100a may include a first side S1a and a second side S2a facing each other in the third direction DR3, and the second sub-antenna patch 120a2 of the first antenna patch 120a may be disposed on the first side S1a of the first dielectric layer 110a of the first antenna 100a. Further, a plurality of pad portions 40 and a connector 50 may be disposed below the second side S2a of the first dielectric layer 110a of the first antenna 100a.

The first antenna 100a may include a first feed via 130a1 and a second feed via 130a2 penetrating through the first layer 110a1 of the first dielectric layer 110a.

The second antenna 100b may include a second dielectric layer 110b and a second antenna patch 120b.

The second dielectric layer 110b may include a fourth layer 110b1, a fifth layer 110b2, and a sixth layer 110b3 sequentially disposed in the third direction DR3.

The fourth layer 110b1 to the sixth layer 110b3 may have different dielectric constants, and the fourth layer 110b1 to the sixth layer 110b3 may have different thicknesses.

The second antenna patch 120b of the second antenna 100b may include a third sub-antenna patch 120b1 disposed on the fourth layer 110b1 of the second dielectric layer 110b, a fourth sub-antenna patch 120b2 disposed on the fifth layer 110b2, and a fifth sub-antenna patch 120b3 disposed on the sixth layer 110b3.

The second dielectric layer 110b of the second antenna 100b may include a third side S1b and a fourth side S2b) facing each other in the third direction DR3, and the fifth sub-antenna patch 120b3 of the second antenna patch 120b may be disposed on the third side S1b of the second dielectric layer 110b of the second antenna 100b. Further, a plurality of pad portions 40 and a plurality of connectors 50 may be disposed on the fourth side S2b of the second dielectric layer 110b of the second antenna 100b.

The second antenna 100b may include a third feed via 130b1 and a fourth feed via 130b2 penetrating through the fourth layer 110b1 of the second dielectric layer 110b.

The antenna device 1000a may include a connection substrate 200 disposed below the first antenna 100a and the second antenna 100b. The connection substrate 200 may include a ground plane 101 and a plurality of metal layers 102 and 103, and the first antenna 100a and the second antenna 100b may be connected to the connection substrate 200 through a plurality of pad portions 40 and a plurality of connectors 50 disposed below the second side S2a of the first dielectric layer 110a and the fourth side S2b of the second dielectric layer 110b. Although not shown, the antenna device 1000a may further include an electronic element (not shown) disposed below the connection substrate 200, and the first feed via 130a1, the second feed via 130a2, the third feed via 130b1, and the fourth feed via 130b2 may receive electrical signals from the electronic element.

When the electrical signal is transmitted to the first feed via 130a1 and the second feed via 130a2, it may be transmitted to the first sub-antenna patch 120a1 of the first antenna patch 120a, and the first sub-antenna patch 120a1 and the second sub-antenna patch 120a2 may transmit or receive the RF signal. Accordingly, the first antenna 100a may transmit or receive the RF signal with a first bandwidth with different polarization characteristics.

When the electrical signal is transmitted to the third feed via 130b1 and the fourth feed via 130b2, it may be transmitted to the third sub-antenna patch 120b1 of the second antenna patch 120b, and the third sub-antenna patch 120b1, the fourth sub-antenna patch 120b2, and the fifth sub-antenna patch 120b3 may transmit or receive the RF signal. Accordingly, the second antenna 100b may transmit or receive the RF signal of a second bandwidth with different polarization characteristics.

However, differing from the antenna device 1000a according to the example described with reference to FIG. 2, the antenna device 1000b may not include an air cavity 11 in the second layer 110a2 of the first dielectric layer 110a of the first antenna 100a. As described above, since the antenna device 1000b may not include an air cavity 11 in the second layer 110a2, the method for manufacturing an antenna device 1000b may be simplified, thereby reducing a manufacturing cost.

As described with reference to FIG. 1, the surface of the first antenna patch 120a of the first antenna 100a may be wider than the surface of the second antenna patch 120b of the second antenna 100b. Further, since the second antenna 100b may be wider than the first antenna 100a with respect to the second direction DR2, the gain of the second antenna 100b, which includes a relatively narrow antenna patch may be increased, and the transmitting or receiving of RF signals may be increased.

The above-noted characteristics of the antenna devices according to the example, are applicable to the antenna device including a plurality of antennae according to the present embodiment.

Figure 4:
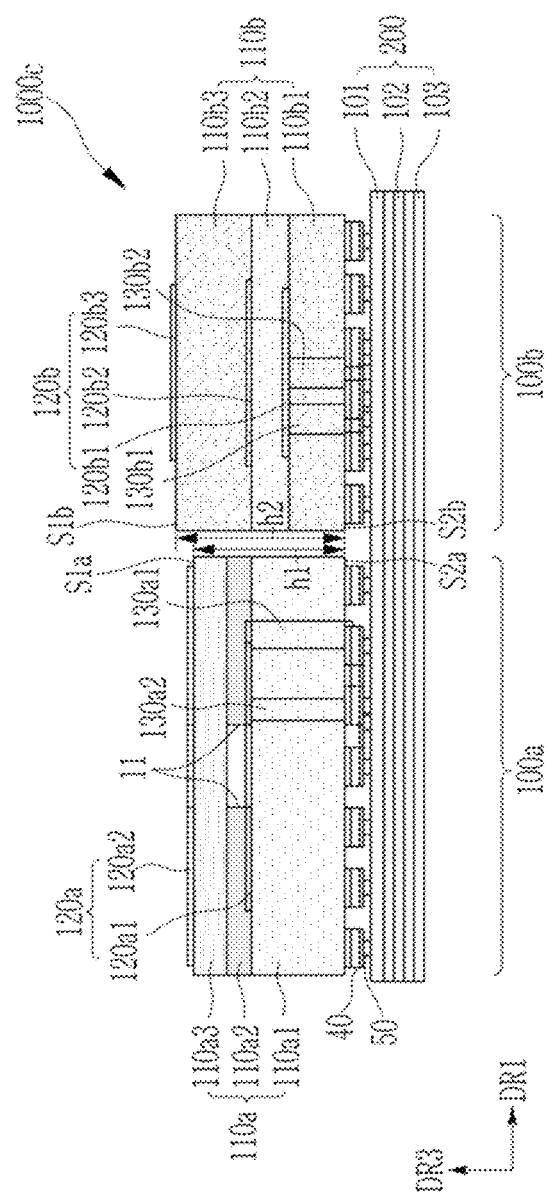
FIG. 4 illustrates a cross-sectional view of an example antenna device, in accordance with one or more embodiments.

An antenna device 1000c, in accordance with one or more embodiments, will now be described with reference to FIG. 1 and FIG. 4. FIG. 4 illustrates a cross-sectional view of an example antenna device, in accordance with one or more embodiments.

Referring to FIG. 1 and FIG. 4, the antenna device 1000c according to the present example is similar to the antenna device 1000a with reference to FIG. 2.

The antenna device 1000c may include a first antenna 100a and a second antenna 100b adjacently disposed in the first direction DR1.

The first antenna 100a may include a first dielectric layer 110a and a first antenna patch 120a.

The first dielectric layer 110a may include a first layer 110a1, a second layer 110a2, and a third layer 110a3 sequentially disposed in the third direction DR3.

In an example, the first layer 110a1 to the third layer 110a3 may have different dielectric constants, and the first layer 110a1 to the third layer 110a3 may have different thicknesses. The second layer 110a2 with a relatively low dielectric constant may have an air cavity 11, by which a length of the dielectric constant boundary between the layers with dielectric constants may be adjusted.

The first antenna patch 120a of the first antenna 100a may include a first sub-antenna patch 120a1 disposed on the first layer 110a1 of the first dielectric layer 110a and a second sub-antenna patch 120a2 disposed on the third layer 110a3 of the first dielectric layer 110a.

The first dielectric layer 110a of the first antenna 100a may include a first side S1a and a second side S2a facing each other in the third direction DR3, and the second sub-antenna patch 120a2 of the first antenna patch 120a may be disposed on the first side S1a of the first dielectric layer 110a of the first antenna 100a. Further, a plurality of pad portions 40 and a plurality of connectors 50 may be disposed below the second side S2a of the first dielectric layer 110a of the first antenna 100a.

The first antenna 100a may include a first feed via 130a1 and a second feed via 130a2 penetrating through the first layer 110a1 of the first dielectric layer 110a.

The second antenna 100b may include a second dielectric layer 110b and a second antenna patch 120b.

The second dielectric layer 110b may include a fourth layer 110b1, a fifth layer 110b2, and a sixth layer 110b3 sequentially disposed in the third direction DR3.

The fourth layer 110b1 to the sixth layer 110b3 may have different dielectric constants, and the fourth layer 110b1 to the sixth layer 110b3 may have different thicknesses.

The second antenna patch 120b of the second antenna 100b may include a third sub-antenna patch 120b1 disposed on the fourth layer 110b1 of the second dielectric layer 110b, a fourth sub-antenna patch 120b2 disposed on the fifth layer 110b2, and a fifth sub-antenna patch 120b3 disposed on the sixth layer 110b3.

The second dielectric layer 110b of the second antenna 100b may include a third side S1b and a fourth side S2b facing each other in the third direction DR3, and the fifth sub-antenna patch 120b3 of the second antenna patch 120b may be disposed on the third side S1b of the second dielectric layer 110b of the second antenna 100b. Further, a plurality of pad portions 40 and a plurality of connectors 50 may be disposed below the fourth side S2b of the second dielectric layer 110b of the second antenna 100b.

The second antenna 100b may include a third feed via 130b1 and a fourth feed via 130b2 penetrating through the fourth layer 110b1 of the second dielectric layer 110b.

The antenna device 1000a may include a connection substrate 200 disposed below the first antenna 100a and the second antenna 100b. The connection substrate 200 may include a ground plane 101 and a plurality of metal layers 102 and 103, and the first antenna 100a and the second antenna 100b may be connected to the connection substrate 200 through a plurality of pad portions 40 and a plurality of connectors 50 disposed below the second side S2a of the first dielectric layer 110a and the fourth side S2b of the second dielectric layer 110b. Although not shown, the connection substrate 200 may further include an electronic element (not shown) disposed below the connection substrate 200, and the first feed via 130a1, the second feed via 130a2, the third feed via 130b1, and the fourth feed via 130b2 may receive electrical signals from the electronic element.

When the electrical signals are transmitted to the first feed via 130a1 and the second feed via 130a2, they are transmitted to the first sub-antenna patch 120a1 of the first antenna patch 120a, and the first sub-antenna patch 120a1 and the second sub-antenna patch 120a2 may transmit or receive RF signals. Accordingly, the first antenna 100a may transmit or receive RF signals with a first bandwidth with different polarization characteristics.

When the electrical signal is transmitted to the third feed via 130b1 and the fourth feed via 130b2, it may be transmitted to the third sub-antenna patch 120b1 of the second antenna patch 120b, and the third sub-antenna patch 120b1, the fourth sub-antenna patch 120b2, and the fifth sub-antenna patch 120b3 may transmit or receive RF signals. Accordingly, the second antenna 100b may transmit or receive RF signals of a second bandwidth with different polarization characteristics.

However, regarding the antenna device 1000c, differing from the antenna device 1000a according to the example described above with reference to FIG. 2, a second height h2 of the second dielectric layer 110b measured to the third side S1b from the fourth side S2b of the second dielectric layer 110b in the third direction DR3 is greater than a first height h1 of the first dielectric layer 110a measured to the first side S1a from the second side S2a of the first dielectric layer 110a in the third direction DR3. In a non-limiting example, a difference between the first height h1 and the second height h2 may be approximately 70 pm. That is, the second height h2 of the second dielectric layer 110b of the second antenna 100b may be greater than the first height h1 of the first dielectric layer 110a of the first antenna 100a with respect to the ground plane 101.

As described above with reference to FIG. 1, the surface of the first antenna patch 120a of the first antenna 100a may be wider than the surface of the second antenna patch 120b of the second antenna 100b. Further, the second antenna 100b may be wider than the first antenna 100a with respect to the second direction DR2, so the gain of the second antenna 100b including a relatively narrow antenna patch for transmitting or receiving RF signals may be increased.

Further, since the second height h2 of the second dielectric layer 110b of the second antenna 100b may be greater than the first height h1 of the first dielectric layer 110a of the first antenna 100a, an influence of the first antenna 100a to the second antenna 100b may be reduced, an isolation degree of the second antenna 100b may increase, and the gain of the second antenna 100b may be increased.

The above-noted characteristics of the antenna devices according to the example are applicable to the antenna device including a plurality of antennae according to the present example.

Figure 5:
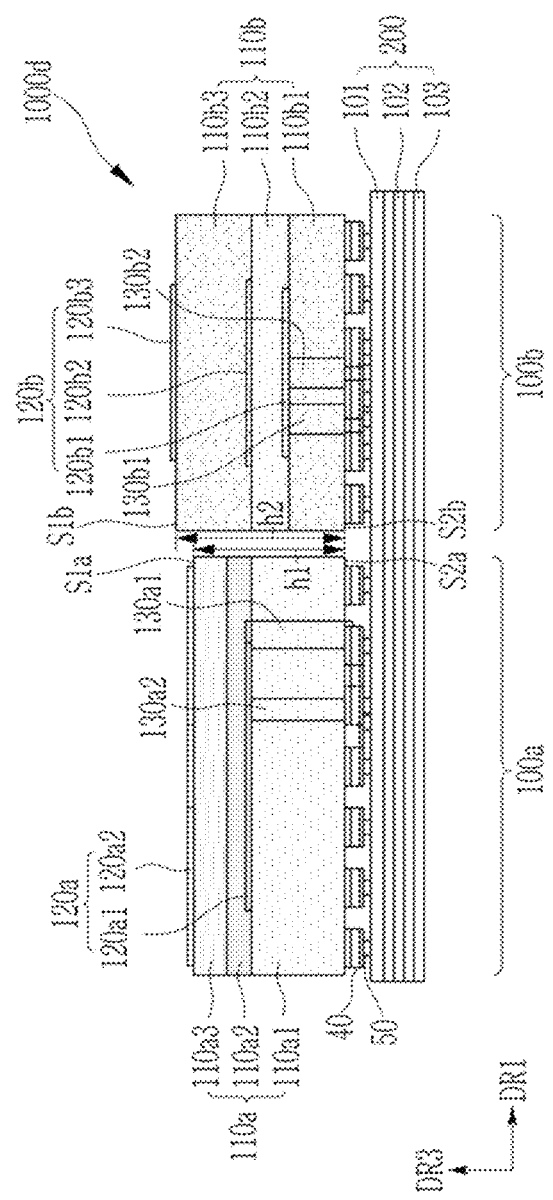
FIG. 5 illustrates a cross-sectional view of an example antenna device, in accordance with one or more embodiments.

An antenna device 1000d according to another example will now be described with reference to FIG. 1 and FIG. 5. FIG. 5 illustrates a cross-sectional view of an example antenna device, in accordance with one or more embodiments.

Referring to FIG. 1 and FIG. 5, the antenna device 1000d according to the present example is similar to the antenna device 1000a according to the example described above with reference to FIG. 2.

The antenna device 1000d may include a first antenna 100a and a second antenna 100b adjacently disposed in the first direction DR1.

The first antenna 100a may include a first dielectric layer 110a and a first antenna patch 120a.

The first dielectric layer 110a may include a first layer 110a1, a second layer 110a2, and a third layer 110a3 sequentially disposed in the third direction DR3.

The first layer 110a1 to the third layer 110a3 may have different dielectric constants, and the first layer 110a1 to the third layer 110a3 may have different thicknesses.

The first antenna patch 120a of the first antenna 100a may include a first sub-antenna patch 120a1 disposed on the first layer 110a1 of the first dielectric layer 110a and a second sub-antenna patch 120a2 disposed on the third layer 110a3 of the first dielectric layer 110a.

The first dielectric layer 110a of the first antenna 100a may include a first side S1a and a second side S2a facing each other in the third direction DR3, and the second sub-antenna patch 120a2 of the first antenna patch 120a may be disposed on the first side S1a of the first dielectric layer 110a of the first antenna 100a. Further, a plurality of pad portions 40 and a plurality of connectors 50 may be disposed below the second side S2a of the first dielectric layer 110a of the first antenna 100a.

The first antenna 100a may include a first feed via 130a1 and a second feed via 130a2 penetrating through the first layer 110a1 of the first dielectric layer 110a.

The second antenna 100b may include a second dielectric layer 110b and a second antenna patch 120b.

The second dielectric layer 110b may include a fourth layer 110b1, a fifth layer 110b2, and a sixth layer 110b3 sequentially disposed in the third direction DR3.

The fourth layer 110b1 to the sixth layer 110b3 may have different dielectric constants, and the fourth layer 110b1 to the sixth layer 110b3 may have different thicknesses.

The second antenna patch 120b of the second antenna 100b may include a third sub-antenna patch 120b1 disposed on the fourth layer 110b1 of the second dielectric layer 110b, a fourth sub-antenna patch 120b2 disposed on the fifth layer 110b2, and a fifth sub-antenna patch 120b3 disposed on the sixth layer 110b3.

The second dielectric layer 110b of the second antenna 100b may include a third side S1b and a fourth side S2b facing each other in the third direction DR3, and the fifth sub-antenna patch 120b3 of the second antenna patch 120b may be disposed on the third side S1b of the second dielectric layer 110b of the second antenna 100b. Further, a plurality of pad portions 40 and a plurality of connectors 50 may be disposed below the fourth side S2b of the second dielectric layer 110b of the second antenna 100b.

The second antenna 100b may include a third feed via 130b1 and a fourth feed via 130b2 penetrating through the fourth layer 110b1 of the second dielectric layer 110b.

The antenna device 1000a may include a connection substrate 200 disposed below the first antenna 100a and the second antenna 100b and including a ground plane 101 and a plurality of metal layers 102 and 103, and the first antenna 100a and the second antenna 100b may be connected to the connection substrate 200 through a plurality of pad portions 40 and a plurality of connectors 50 disposed below the second side S2a of the first dielectric layer 110a and the fourth side S2b of the second dielectric layer 110b. Although not shown, the connection substrate 200 may further include an electronic element (not shown) disposed below the connection substrate 200, and the first feed via 130a1, the second feed via 130a2, the third feed via 130b1, and the fourth feed via 130b2 may receive electrical signals from the electronic element.

When the electrical signal is transmitted to the first feed via 130a1 and the second feed via 130a2, it may be transmitted to the first sub-antenna patch 120a1 of the first antenna patch 120a, and the first sub-antenna patch 120a1 and the second sub-antenna patch 120a2 may transmit and receive RF signals. Accordingly, the first antenna 100a may transmit or receive the RF signals with a first bandwidth with different polarization characteristics.

When the electrical signal is transmitted to the third feed via 130b1 and the fourth feed via 130b2, it may be transmitted to the third sub-antenna patch 120b1 of the second antenna patch 120b, and the third sub-antenna patch 120b1, the fourth sub-antenna patch 120b2, and the fifth sub-antenna patch 120b3 may transmit or receive RF signals. Accordingly, the second antenna 100b may transmit or receive the RF signals of a second bandwidth with different polarization characteristics.

However, regarding the antenna device 1000d, differing from the antenna device 1000a according to the example described above with reference to FIG. 2, the second height h2 of the second dielectric layer 110b measured to the third side S1b from the fourth side S2b of the second dielectric layer 110b of the second antenna 100b in the third direction DR3 is greater than the first height h1 of the first dielectric layer 110a measured to the first side S1a from the second side S2a of the first dielectric layer 110a in the third direction DR3. In a non-limiting example, the difference between the first height h1 and the second height h2 may be approximately 70 μm.

Further, regarding the antenna device 1000d, differing from the antenna device 1000a according to the example described above with reference to FIG. 2, an air cavity 11 may not be included in the second layer 110a2 of the first dielectric layer 110a of the first antenna 100a. As described above, since an air cavity 11 may not be included in the second layer 110a2, the method for manufacturing an antenna device 1000b may be simplified, thereby reducing a manufacturing cost.

As described with reference to FIG. 1, in an example, the surface of the first antenna patch 120a of the first antenna 100a may be wider than the surface of the second antenna patch 120b of the second antenna 100b. Further, as the second antenna 100b may be wider than the first antenna 100a with respect to the second direction DR2, the gain of the second antenna 100b including a relatively narrow antenna patch for transmitting or receiving RF signals may be increased.

Further, since the second height h2 of the second dielectric layer 110b of the second antenna 100b may be greater than the first height h1 of the first dielectric layer 110a of the first antenna 100a, an influence of the first antenna 100a to the second antenna 100b may be reduced, an isolation degree of the second antenna 100b may increase, and the gain of the second antenna 100b may be increased.

The above-noted characteristics of the antenna devices according to the example are applicable to the antenna device including a plurality of antennae according to the present example.

Figure 6:
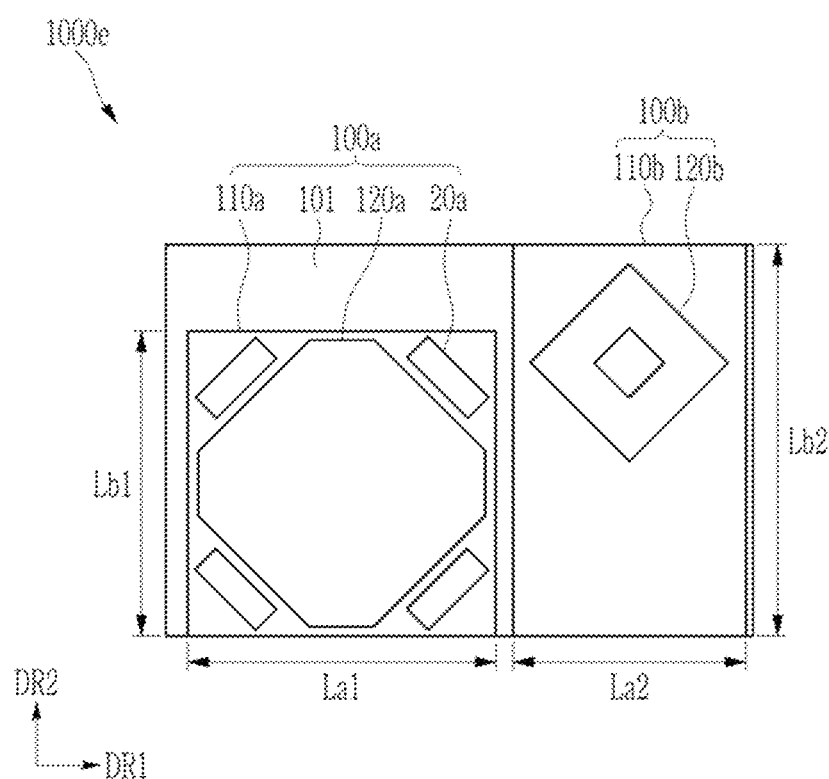
FIG. 6 illustrates a top plan view of an example antenna device, in accordance with one or more embodiments.

An antenna device according to an example will now be described with reference to FIG. 6. FIG. 6 illustrates a top plan view of an example antenna device, in accordance with one or more embodiments.

Referring to FIG. 6, the antenna device according to the present example is similar to the antenna device according to the example described with reference to FIG. 1. Detailed descriptions on the same constituent elements will be omitted. However, differing from the antenna device according to the example described with reference to FIG. 1, the antenna device 1000e according to the present example may include a ground plane 101 overlapping the first antenna patch 120a and the second antenna patch 120b with the first dielectric layer 110a and the second dielectric layer 110b therebetween.

The antenna device 1000e includes a first antenna 100a and a second antenna 100b adjacently disposed in the first direction DR1.

The first antenna 100a includes a first dielectric layer 110a disposed on the ground plane 101, and a first antenna patch 120a facing the ground plane 101 with the first dielectric layer 110a therebetween. The first antenna 100a further includes auxiliary antenna patches 20a disposed around the first antenna patch 120a.

The first dielectric layer 110a of the first antenna 100a may have a first width La1 in parallel with the first direction DR1, and a second width Lb1 in parallel with the second direction DR2 that is substantially perpendicular to the first direction DR1.

The second antenna 100b includes a second dielectric layer 110b disposed on the ground plane 101, and a second antenna patch 120b facing the ground plane 101 with the second dielectric layer 110b therebetween.

The second dielectric layer 110b of the second antenna 100b may have a third width La2 in parallel with the first direction DR1, and a fourth width Lb2 in parallel with the second direction DR2 that is substantially perpendicular to the first direction DR1.

The first width La1 of the first dielectric layer 110a of the first antenna 100a may be greater than the third width La2 of the second dielectric layer 110b of the second antenna 100b, but the second width Lb1 of the first dielectric layer 110a of the first antenna 100a may be less than the fourth width Lb2 of the second dielectric layer 110b of the second antenna 100b.

The first antenna 100a may transmit or receive RF signals with a first bandwidth, and the second antenna 100b may transmit or receive RF signals of a second bandwidth that is different from the first bandwidth. The center frequency of the first bandwidth may be lower than the center frequency of the second bandwidth.

According to the antenna device 1000 according to an example, the second antenna 100b may be wider than the first antenna 100a with respect to the second direction DR2, so the gain of the second antenna 100b for transmitting or receiving the RF signals with a relatively high frequency bandwidth may be increased.

Figure 7:
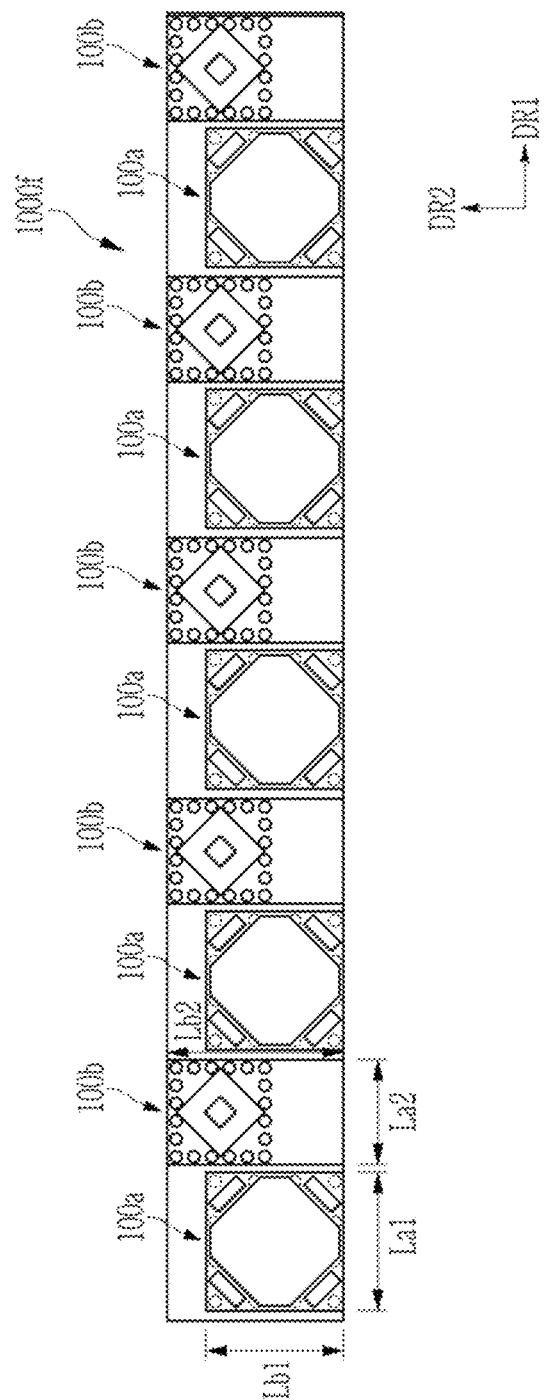
FIG. 7 illustrates a top plan view of an example antenna device, in accordance with one or more embodiments.

An antenna device including a plurality of antennae according to an example will now be described with reference to FIG. 1 and FIG. 7. FIG. 7 illustrates a top plan view of an example antenna device, in accordance with one or more embodiments.

The antenna device 1000f according to the present example includes a plurality of first antennae 100a and a plurality of second antennae 100b. In an example, the first antennas 100a and the second antennas 100b may be implemented as one pair, and they may be disposed in pairs in the first direction DR1. The first antennas 100a and the second antennas 100b may be similar to the antenna devices 1000, 1000a, 1000b, 1000c, 1000d, and 1000e according to the above-described examples.

A plurality of first antennae 100a and a plurality of second antennae 100b may be connected to electronic elements (not shown), and may receive electrical signals.

The above-noted characteristics of the antenna devices according to the embodiment are applicable to the antenna device including a plurality of antennae according to the present example.

Figure 8:
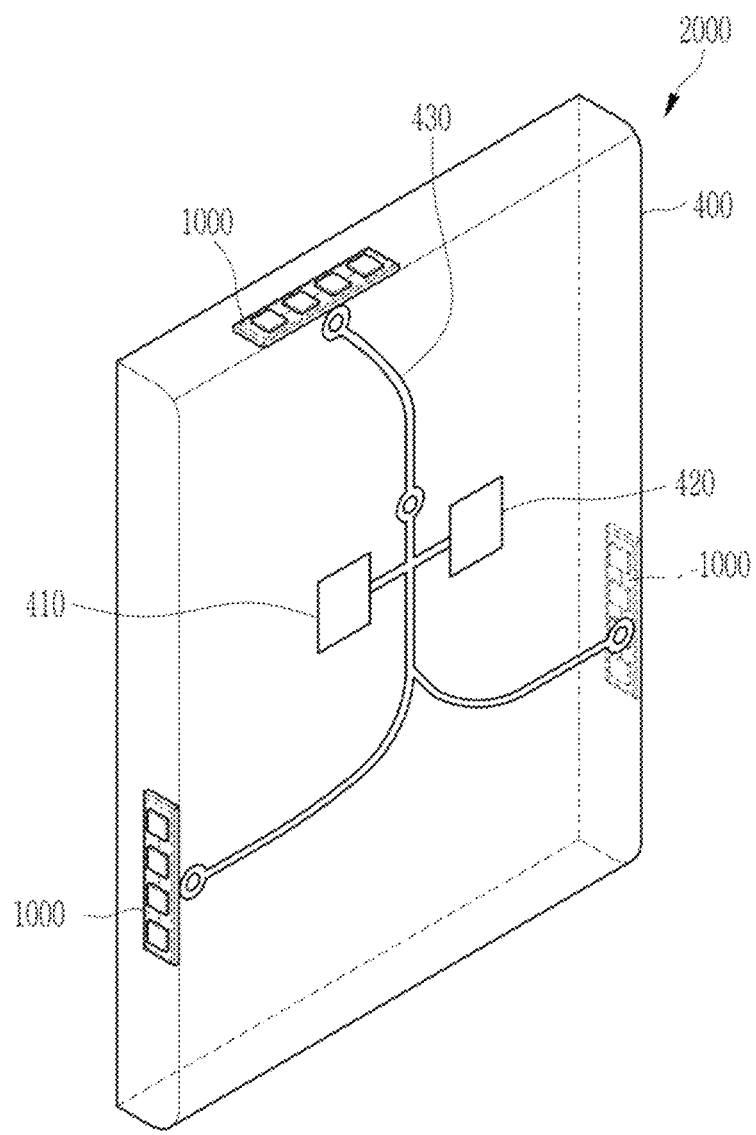
FIG. 8 illustrates a schematic diagram of an example electronic device including an example antenna device, in accordance with one or more embodiments.

An electronic device including an antenna device, in accordance with one or more embodiments, will now be described with reference to FIG. 8. FIG. 8 illustrates a schematic diagram of an example electronic device including an antenna device, in accordance with one or more embodiments.

Referring to FIG. 8, the electronic device 2000 according to an example includes at least one antenna device 1000, and the antenna device 1000 may be disposed on a set 400 of the electronic device 2000.

The electronic device 2000 may be, as non-limiting examples, a smart phone, a personal digital assistant, a digital video camera, a digital still camera, a network system, a computer, a monitor, a tablet, a laptop, a netbook, a television, a video game, a smart watch, and an automotive part, and is not limited thereto.

The electronic device 2000 may have, as a non-limiting example, a polygonal side, and the antenna device 1000 may be disposed to be adjacent to at least part of a plurality of sides of the electronic device 2000.

A communication module 410 and a baseband circuit 420 may be disposed on the set 400, and the antenna device 1000 may be electrically connected the communication module 410 and the baseband circuit 420 through a coaxial cable 430.

To perform digital signal processing, the communication module 410 may include at least one of memory chips such as a volatile memory (e.g., a DRAM), a non-volatile memory (e.g., a ROM), or a flash memory, application processor chips such as a central processing unit (e.g., a CPU), a graphics processing unit (e.g., a GPU), a digital signal processor, an encoding processor, a microprocessor, or a microcontroller, and logic chips such as an analog-digital converter or an application-specific IC (ASIC).

The baseband circuit 420 may generate a base signal by performing analog to digital conversion, amplifying an analog signal, performing filtering, and performing frequency conversion. The base signal input/output from the baseband circuit 420 may be transmitted to the antenna device through a cable. In an example, the base signal may be transmitted to the IC through an electrical connection structure, a core via, and a wire, and the IC may convert the base signal to the RF signal in the millimeter wave (mm-Wave) bandwidth.

Although not shown, each the antenna device 1000 may include a plurality of first antennae 100a and a plurality of second antennae 100b, and the first antenna 100a and the second antenna 100b may be similar to the above-described antenna devices 1000, 1000a, 1000b, 1000c, 1000d, and 1000e according to the examples.

Figure 9:
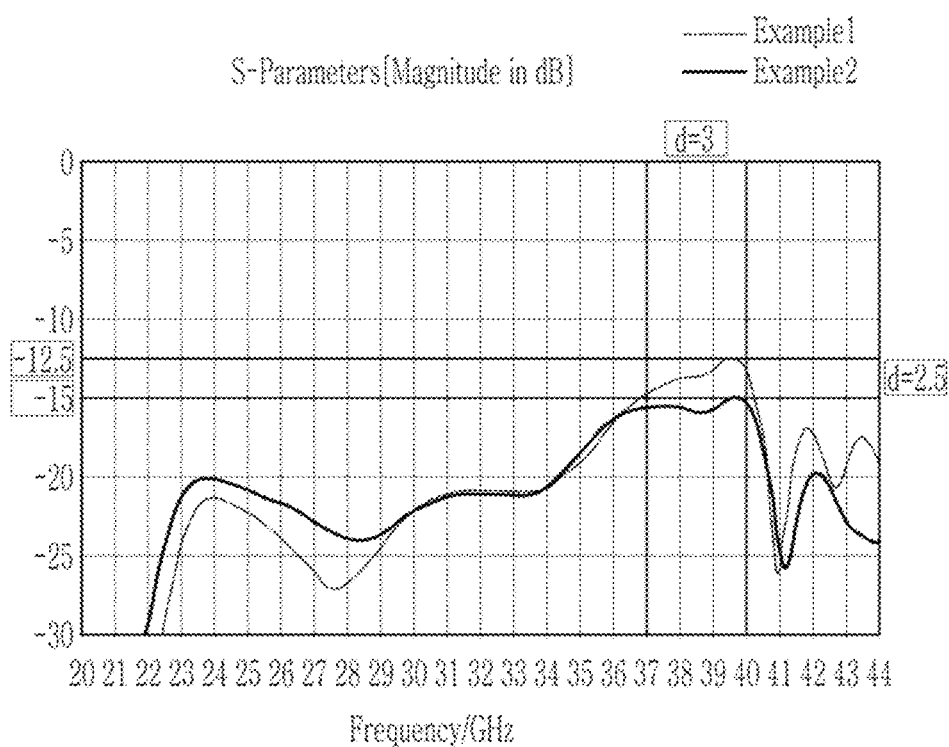
FIG. 9 illustrates a graph of results of an experimental example.

An experimental example will now be described with reference to FIG. 9. FIG. 9 shows a graph of results of an experimental example.

In the present experimental example, the first antenna 100a that transmits or receives the RF signal with a first bandwidth with a relatively low center frequency and the second antenna 100b that transmits or receives the RF signal of a second bandwidth with a relatively high center frequency are formed.

Other conditions are given in a same way, the antenna device is manufactured according to a first example (Example 1) in which the first width La1 and the second width Lb1 of the first dielectric layer 110a of the first antenna 100a are formed to be greater than the third width La2 and the fourth width Lb2 of the second dielectric layer 110b of the second antenna 100b, and a second example (Example 2) in which the first width La1 of the first dielectric layer 110a of the first antenna 100a is greater than the third width La2 of the second dielectric layer 110b of the second antenna 100b with respect to the first direction DR1 but the second width Lb1 of the first dielectric layer 110a of the first antenna 100a is less than the fourth width Lb2 of the second dielectric layer 110b if the second antenna 100b with respect to the second direction DR2 that is perpendicular to the first direction DR1 in a like manner of the antenna device according to an example.

With regard to the first example (Example 1) and the second example (Example 2), after manufacturing the antenna device, the electrical signal may be applied to the first antenna 100a, an S-parameter that indicates whether an influence is given to the second antenna 100b may be measured, and a result is shown in FIG. 9.

Referring to FIG. 9, compared to the first example (Example 1), according to the second example (Example 2), the influence of the signal applied to the first antenna 100a to the second antenna 100b may be reduced by about 2.5 dB in the range of the RF bandwidth, that is, about 37 GHz to about 40 GHz.

As described, in a similar manner of the antenna device according to an embodiment, the isolation degree of the second antenna 100b may increase in the second example (Example 2) in which the first width La1 of the first dielectric layer 110a of the first antenna 100a is greater than the third width La2 of the second dielectric layer 110b of the second antenna 100b with respect to the first direction DR1, but the second width Lb1 of the first dielectric layer 110a of the first antenna 100a is formed to be less than the fourth width Lb2 of the second dielectric layer 110b of the second antenna 100b with respect to the second direction DR2 that is perpendicular to the first direction DR1, and by this, the gain of the second antenna 100b is increased.

Figure 10A:
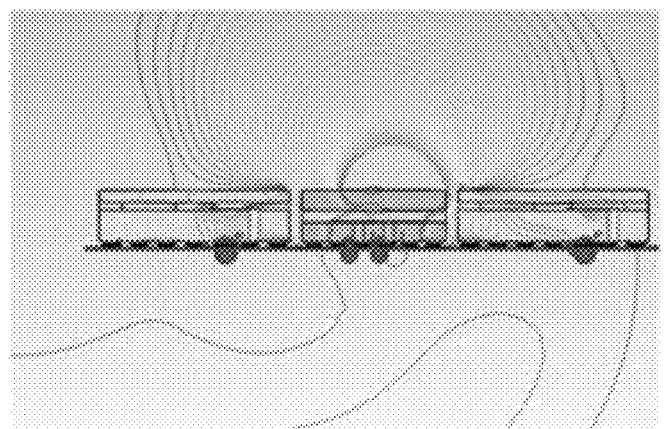
FIGS. 10A and 10B illustrate results of one experimental example.
Figure 10B:
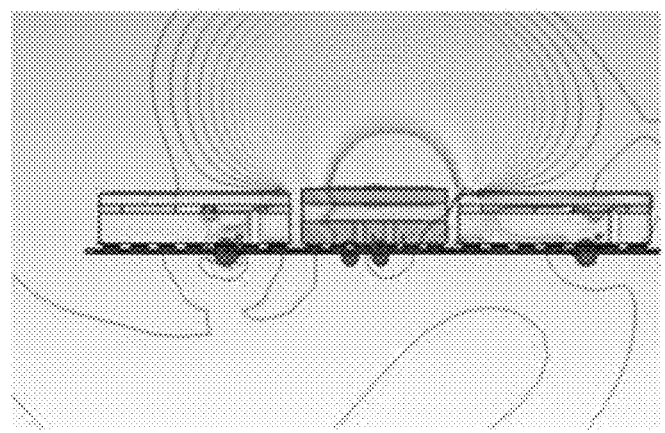

Another experimental example will now be described with reference to FIGS. 10A and 10B. FIGS. 10A and 10B illustrate results of experimental examples.

In the present experimental example, the first antenna 100a that transmits or receives the RF signal with a first bandwidth with a relatively low center frequency and the second antenna 100b that transmits or receives the RF signal of a second bandwidth with a relatively high center frequency are formed.

Other conditions are given in a same way, and the antenna device is manufactured according to a first example (Example 1) in which the height of the first dielectric layer 110a of the first antenna 100a is equal to the height of the second dielectric layer 110b of the second antenna 100b, and a second example (Example 2) in which the second height h2 of the second dielectric layer 110b of the second antenna 100b is set to be greater than the first height h1 of the first dielectric layer 110a of the first antenna 100a.

Regarding the first example (Example 1) and the second example (Example 2) after manufacturing the antenna device, intensity of the electric field generated when the electrical signal is applied to the second antenna 100b while no electrical signal is applied to the first antenna 100a is measured, and the result is shown in FIG. 10.

FIG. 10A illustrates a result of the first example (Example 1), and FIG. 10B illustrates a result of the second example (Example 2).

Referring to FIGS. 10A and 10B, in a similar manner of the antenna device according to an embodiment, the intensity of the electric field around the second antenna 100b may become bigger in the second example (Example 2) in which the second height h2 of the second dielectric layer 110b of the second antenna 100b is greater than the first height h1 of the first dielectric layer 110a of the first antenna 100a, by which it is found that the gain of the second antenna 100b is increased.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna device, comprising:
a first dielectric layer and a second dielectric layer separated from each other in a first direction, the first dielectric layer comprising a first side and a second side facing each other in a third direction, and the second dielectric layer comprising a third side and a fourth side facing each other in the third direction;
a first antenna patch, disposed on the first side of the first dielectric layer; and
a second antenna patch, disposed on the third side of the second dielectric layer,
wherein a signal comprising a first frequency bandwidth is transmitted and received based on an electrical signal applied to the first antenna patch,
wherein a signal with a second frequency bandwidth that is different from the first frequency bandwidth is transmitted and received based on an electrical signal applied to the second antenna patch, and
wherein, in a direction parallel to the third direction, a height of the second dielectric layer measured from the fourth side of the second dielectric layer to the third side of the second dielectric layer is greater than a height of the first dielectric layer measured from the second side of the first dielectric layer to the first side of the first dielectric layer.

2. The antenna device of claim 1, wherein:
a center frequency of the first frequency bandwidth is lower than a center frequency of the second frequency bandwidth.

3. The antenna device of claim 2, wherein:
a first surface of the first antenna patch is larger than a first surface of the second antenna patch.

4. The antenna device of claim 2, further comprising:
a ground plane, disposed below the second side of the first dielectric layer, and disposed below the fourth side of the second dielectric layer.

5. The antenna device of claim 4, wherein:
the first dielectric layer comprises a first layer of a first dielectric constant, and a second layer of a second dielectric constant that is different from the first dielectric constant, and
the second layer comprises a small dielectric constant, and includes an air cavity.

6. The antenna device of claim 1, wherein:
the third direction is perpendicular to the first direction.

7. The antenna device of claim 6, wherein:
the first dielectric layer comprises a first layer of a first dielectric constant, and a second layer of a second dielectric constant that is different from the first dielectric constant, and
the second layer comprises a small dielectric constant, and includes an air cavity.

8. An antenna device, comprising:
a first dielectric layer and a second dielectric layer separated from each other in a first direction;
a first antenna patch, disposed on the first dielectric layer; and
a second antenna patch, disposed on the second dielectric layer,
wherein the first dielectric layer has a first width in parallel with the first direction, and a second width in parallel with a second direction, and
wherein the second dielectric layer has a third width in parallel with the first direction, and a fourth width in parallel with the second direction,
wherein the first width is greater than the third width, and
wherein the second width is less than the fourth width.

9. The antenna device of claim 8, wherein:
a signal with a first frequency bandwidth is transmitted and received based on an electrical signal applied to the first antenna patch,
a signal with a second frequency bandwidth is transmitted and received based on an electrical signal applied to the second antenna patch, and
a center frequency of the first frequency bandwidth is lower than a center frequency of the second frequency bandwidth.

10. The antenna device of claim 9, wherein:
a first surface of the first antenna patch is larger than a first surface of the second antenna patch.

11. The antenna device of claim 9, further comprising:
a ground plane disposed below the first dielectric layer and the second dielectric layer in a third direction.

12. The antenna device of claim 11, wherein:
a height of the second dielectric layer is greater than a height of the first dielectric layer with respect to the ground plane in a direction parallel to the third direction.

13. The antenna device of claim 12, wherein:
the second direction is perpendicular to the first direction.

14. The antenna device of claim 8, further comprising:
a ground plane disposed below the first dielectric layer and the second dielectric layer in a third direction,
wherein a height of the second dielectric layer is greater than a height of the first dielectric layer with respect to the ground plane in a direction parallel to the third direction.

15. The antenna device of claim 8, wherein:
a first surface of the first antenna patch is larger than a first surface of the second antenna patch.

16. An antenna device, comprising:
a plurality of first dielectric layers and a plurality of second dielectric layers separated from each other, and alternately disposed in a first direction;
a plurality of first antenna patches, disposed on the first dielectric layers; and
a plurality of second antenna patches, disposed on the second dielectric layers,
wherein the respective first dielectric layers have a first width in parallel with the first direction, and a second width in parallel with the second direction,
wherein the respective second dielectric layers have a third width in parallel with the first direction and a fourth width in parallel with the second direction,
wherein the first width is greater than the third width, and
wherein the second width is less than the fourth width.

17. The antenna device of claim 16, wherein:
a signal with a first frequency bandwidth is transmitted and received based on an electrical signal applied to the first antenna patches,
a signal with a second frequency bandwidth is transmitted and received based on an electrical signal applied to the second antenna patches, and a center frequency of the first frequency bandwidth is lower than a center frequency of the second frequency bandwidth.

18. The antenna device of claim 17, further comprising:

a ground plane disposed below the first dielectric layers and the second dielectric layers, wherein a height of the second dielectric layers is greater than a height of the first dielectric layers with respect to the ground plane.

19. The antenna device of claim 16, wherein:

a first surface of the first antenna patches is larger than a first surface of the second antenna patches.

20. The antenna device of claim 16, further comprising:

a ground plane, disposed below the first dielectric layers and the second dielectric layers, wherein a height of the second dielectric layers is greater than a height of the first dielectric layers with respect to the ground plane.

* * * * *